United States Patent
Heo (10) Patent No.: US 10,060,755 B2
(45) Date of Patent: Aug. 28, 2018

(54) METHOD, SYSTEM AND TERMINAL FOR PROVIDING MAP INFORMATION

(71) Applicant: SK PLANET CO., LTD., Seongnam-si, Gyeonggi-do (KR)

(72) Inventor: Jihye Heo, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 127 days.

(21) Appl. No.: 15/336,417

(22) Filed: Oct. 27, 2016

(65) Prior Publication Data
US 2017/0045371 A1 Feb. 16, 2017

Related U.S. Application Data

(60) Division of application No. 14/407,006, filed on Dec. 10, 2014, now Pat. No. 9,513,138, which is a
(Continued)

(30) Foreign Application Priority Data

Nov. 14, 2012 (KR) ........................ 10-2012-0129158

(51) Int. Cl.
*G01C 21/36* (2006.01)
*H04W 88/02* (2009.01)
(Continued)

(52) U.S. Cl.
CPC ..... *G01C 21/3667* (2013.01); *G01C 21/3682* (2013.01); *G06F 17/30241* (2013.01);
(Continued)

(58) Field of Classification Search
CPC ........................... G01C 21/3667; G01C 21/36; G01C 21/3682; G01C 21/367; G01C 21/3638;
(Continued)

(56) References Cited

U.S. PATENT DOCUMENTS

2010/0324816 A1 12/2010 Highstrom et al.
2011/0044494 A1* 2/2011 Bradley ................ G06T 1/0064
382/100
(Continued)

FOREIGN PATENT DOCUMENTS

KR 1020000061595 A 10/2000
KR 1020040096683 A 11/2004
(Continued)

OTHER PUBLICATIONS

International Search Report for application PCT/KR2013/007294 dated Nov. 27, 2013.
(Continued)

*Primary Examiner* — Behrang Badii
(74) *Attorney, Agent, or Firm* — Brinks Gilson & Lione (57) ABSTRACT

Disclosed are a method and system for providing map information by a terminal supporting a navigation function, and more particularly, variably displaying map information as a streaming image map or an embedded vector map according to a travel state in a route guide service. Accordingly, since the present invention variably supports two-type map information including the embedded vector map and the streaming image map in the navigation function, it is possible to use map information through the streaming image map when a detailed, clear image is needed, and it is possible to use a route guide service through the embedded vector map providing more accurate and general map information while moving. Also, it is possible to efficiently receive map information applied to a navigation function from a service device connected through a communication network and accordingly, it is possible to efficiently perform the navigation function provided from a terminal.

8 Claims, 6 Drawing Sheets

Related U.S. Application Data continuation of application No. PCT/KR2013/007294, filed on Aug. 13, 2013.

(51) Int. Cl.
| | | |
|---|---|---|
| *G06F 17/30* | (2006.01) | |
| *G09B 29/10* | (2006.01) | |
| *G09G 5/00* | (2006.01) | |
| *G06T 15/04* | (2011.01) | |
| *G09G 5/14* | (2006.01) | |
| *G06T 17/05* | (2011.01) | |
| *G06T 11/20* | (2006.01) | |

(52) U.S. Cl.
CPC .......... *G09B 29/106* (2013.01); *H04W 88/02* (2013.01); *G01C 21/36* (2013.01); *G01C 21/367* (2013.01); *G06T 11/203* (2013.01); *G06T 15/04* (2013.01); *G06T 17/05* (2013.01); *G09G 5/00* (2013.01); *G09G 5/14* (2013.01)

(58) Field of Classification Search
CPC . G09G 5/00; G09G 5/006; G09G 5/14; G06T 15/04; G06T 19/00; G06T 11/203; G06T 17/05; G06T 15/205; G06T 17/20; G06T 19/20; G06F 17/30241; G09B 29/106; H04W 88/02

See application file for complete search history.

(56) References Cited

U.S. PATENT DOCUMENTS

| | | | | |
|---|---|---|---|---|
| 2013/0321442 | A1* | 12/2013 | Van Os ................ | G09G 5/00 345/582 |
| 2013/0321443 | A1* | 12/2013 | Pahwa ................ | G06T 15/04 345/587 |
| 2013/0321456 | A1* | 12/2013 | Hultquist .......... | G01C 21/3667 345/629 |
| 2013/0325322 | A1* | 12/2013 | Blumenberg ........ | G01C 21/367 701/420 |
| 2014/0192154 | A1 | 7/2014 | Jeong et al. | |
| 2014/0341289 | A1 | 11/2014 | Schwarz et al. | |

FOREIGN PATENT DOCUMENTS

| | | |
|---|---|---|
| KR | 1020050122723 A | 12/2005 |
| KR | 1020090121062 A | 11/2009 |
| WO | 2007097530 A1 | 8/2007 |

OTHER PUBLICATIONS

Korean Office Action for application 10-2012-0129158 dated Feb. 18, 2014.

* cited by examiner

METHOD, SYSTEM AND TERMINAL FOR PROVIDING MAP INFORMATION

CROSS REFERENCE TO RELATED APPLICATION

This application is a divisional of U.S. patent application Ser. No. 14/407,006, filed Dec. 10, 2014, which claims the priority of Korean Patent Application No. 10-2012-0129158 filed on Nov. 14, 2012 in the KIPO (Korean Intellectual Property Office), and is the National Phase application of International Application No. PCT/KR2013/007294 filed on Aug. 13, 2013, which designates the United States and was published in Korean, the entirety of which is incorporated herein by reference.

TECHNICAL FIELD

The present invention relates to a method for providing map information of an apparatus thereof, and more particularly, to a map information providing method of displaying map information by variably applying a streaming image map and an embedded vector map depending on a travel state in a route guide service, a terminal thereof.

BACKGROUND ART

With development of the mobile communication network and improvement of the specification of terminals, a portable terminal has become a necessity for modern society rather than serving as a simple communication device or an information providing device, and further has evolved into a total entertainment device.

A navigation system, referred to as an automotive navigation system, is a system for providing location information required for driving transportation apparatuses, such as a vehicle, a vessel and an air craft, by using satellites. The navigation system receives predetermined data from global positioning system (GPS) satellites, which are hovering above the Earth, by use of a GPS receiver, and calculates the location thereof based on the received data. As a plurality of GPS satellites are hovering above the Earth, the transportation apparatus may receive GPS signals from any three of the GPS satellites regardless of where the transportation apparatus exists on Earth, and calculate the location thereof based on the received GPS signals. The navigation system provides various types of travel information to the transportation apparatus, such as a vehicle, based on the calculated location information thereof. The existing navigation system is mainly used for a large-scale moving object, such as an aircraft or a vessel, in the location calculation or navigation, but in recent years, has been used even for a vehicle. In particular, the navigation system for today provides a user with various types of information, for example, current location information about a transportation apparatus, route information from the current location to the destination of a transport apparatus, map information related to location information and route information, and traffic condition information.

If the navigation apparatus provides a user with information such as the current location of a transportation apparatus by using map information, the user may rapidly and easily recognize the current location, and thus it is common for the navigation apparatus to provide the current location information together with map information.

However, a terminal supporting the conventional navigation function only uses map information that is stored in the terminal, and therefore only schematic map information is provided. Accordingly, there is a limitation in providing map information including additional information, which has details and varies in real time, such as a surrounding area of an origin and a surrounding area of a destination.

DISCLOSURE

Technical Problem

The present invention provides a method of displaying map information by variably applying a streaming image map and an embedded vector map depending on a travel state in a route guide service performed based on a map, an apparatus thereof.

The present invention provides a map information providing method of displaying map information based on a streaming image map received in a streaming scheme from a service upon an initial execution of an application in a terminal, and upon movement along a predetermined route, displaying map information varying with the movement, based on an embedded vector map that is stored in the terminal in advance, an apparatus thereof.

Technical Solution

According to an aspect of the present invention, there is provided a method for providing map information at an apparatus configured to switch map information between a streaming image map basis and an embedded vector map basis and display the map information, the method comprising: executing a map application; switching the streaming image map basis to the embedded vector map basis when route guidance commences in the map application and movement is detected; displaying map information that is stored in advance on the embedded vector map basis according to the route guidance; switching the embedded vector map basis to the streaming image map basis when the route guidance is terminated; and requesting map information corresponding to current location information from a service device and displaying the map information received from the service device in a streaming manner on the streaming image map basis.

The executing of the map application may comprises: requesting map information of an initial screen corresponding to location information of the map application from the service device; receiving the map information corresponding to the initial screen from the service device in a streaming manner; and displaying the received map information on the streaming image map basis.

Before the switching of the streaming image map basis to the embedded vector map basis, the method may further comprise, requesting map information which is to be displayed on the embedded vector map basis from the service device; receiving the map information from the service device; and storing the received map information.

The method may further comprises, detecting an event indicating that the apparatus stops moving or an event requesting detailed map information about a surrounding area of a current location occurs while the route guidance is performed; requesting map information corresponding to the current location information from the service device; receiving the map information from the service device in a streaming manner; and displaying the received map information on the streaming image map basis.

According to an aspect of the present invention, there is provided an apparatus configured to switch map information between a streaming image map basis and an embedded vector map basis and display the map information, the apparatus comprising: a communication unit configured to receive map information from a service device in a streaming manner; a storage unit configured to store the map information, which has already been received from the service device, on the embedded vector map basis; a control unit configured to perform control to switch the streaming image map basis to the embedded vector map basis and display map information prestored in the storage unit on the embedded vector map basis according to route guidance when executing a map application to start the route guidance and detecting movement, and configured to perform control to switch the embedded vector map basis to the streaming image map basis, request and receive map information corresponding to current location information from the service device through the communication unit and then display the map information on the streaming image map basis when the route guidance is terminated; and a display unit configured to switch map information on the streaming image map basis or the embedded vector map basis and display the map information according to the control performed the control unit.

The control unit, when the map application is executed, may request map information of an initial screen corresponding to location information from the service device through the communication unit, and performs control to display the map information received from the service device in a streaming manner through the communication unit on the streaming image map basis.

The location information may indicate location information currently obtained by locating the apparatus or location information of a destination input by a user.

The control unit may perform control to receive map information about a surrounding to area of a current location from the service device when detecting an event indicating that the apparatus stops moving or an event requesting detailed map information about the surrounding area of the current location while the route guidance is performed, and display the received map information on the streaming image map basis.

Advantageous Effects

According to the above-described aspects of the present invention, at the time of providing a map-based service, in particular, as for a navigation function including a route guide service, two types of map information including embedded vector map-based map information and streaming image map-based map information are variably supported so that map information is displayed in the form of a streaming image map when a detailed and clear image is needed, and more accurate and comprehensive map information is provided through an embedded vector map while on the move.

In addition, according to the above-described aspects of the present invention, a streamlining image map provided from the service device, which is connected to a communication network, in real time and an embedded vector map stored in the terminal are variably operated for efficiency, so that the map-based service, in particular, a navigation function is efficiency performed depending on the situation of the network and the terminal.

MODE FOR INVENTION

Hereinafter, exemplary embodiments of the present invention will be described in detail with reference to the accompanying drawings. In the following description and accompanying drawings, detailed description of functions and configurations, which have been widely known in the art and may obscure essential points of the present invention, are omitted. Like numbers 2o refer to like elements throughout the description of the figures.

The terminology used in the specification and claims should not be construed as the meaning commonly used by one of ordinary skill in the art or those defined in commonly used dictionaries, and should be construed as having a meaning and concept consistent with their meaning in the context of the technical aspect based on the principle that the inventors can appropriately define the concept of terminology to provide the best explanation of their invention. Accordingly, embodiments set forth herein and configurations illustrated in the drawings are shown only as the most preferred embodiment rather than representing all of the technical sprit of the present invention. Therefore, it should be understood that there may be various equivalents and alternatives that may replace them at the time of application.

Although the following description will be made in relation to a mobile communication terminal connected to a communication network to provide a navigation function, as a representative example of a terminal, the present invention is not limited thereto. For example, the present invention can be applied to all information communication devices and various types of terminals, for example, a multimedia terminal, a wired terminal, a fixed terminal and an Internet protocol (IP) terminal. In addition, when the terminal is provided using a mobile terminal having variety of mobile communication specifications, such as a cellular phone, a portable multimedia player (PMP), a mobile Internet device (MID), a smart phone, a desktop, a table computer, a laptop (note book), netbook and information communication devices, the efficiency of utilization is enhanced.

"A streaming image map" according to an embodiment of the present invention is an image map received from a service device in a streaming scheme, that is, map information received in a complete form, such as a picture. The streaming image map is map information in the form of a complete image that represents a predetermined range based on a certain location (a current location of a terminal) by using a plurality of pixels. The streaming image map is a map that displays a detailed image about map information, which is received by a terminal from a service device in a streamlining manner, on a start-up scene according to execution of a navigation function, or to represent map information when a vehicle or user's movement stops. Map information provided in the form of a streaming image map is a more detailed and sophisticated image when compared to map information based on an embedded vector map provided while a vehicle or a user moves.

Meanwhile, "an embedded vector map" is map information that is stored in a terminal, and composed of a line and a curved line that are defined by a mathematical object. The embedded vector map may be downloaded from a service device at any time regardless of execution of a navigation function, and stored in the terminal. The embedded vector map may display map information associated with a predetermined route when a vehicle or a user moves.

The terminal according to an embodiment of the present invention, during execution of an application, uses an embedded vector map in a navigation mode and uses a streaming image map in a map mode.

The present invention is applicable when providing all of the services are performed to based on a map, and in the following specification, a navigation function is described as a representative map-based service, However, the present invention is not limited thereto, and may be applicable to all map-based services other than the navigation function.

Figure 1:
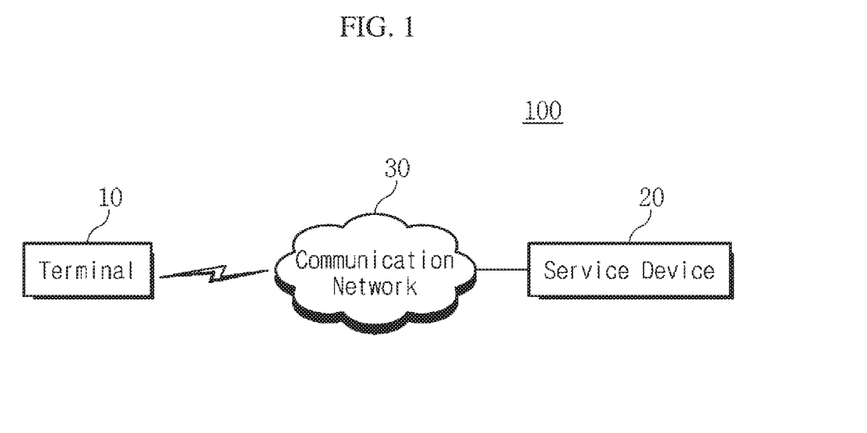
FIG. 1 is a view illustrating a system for providing map information according to an embodiment of the present invention.

FIG. 1 is a view illustrating a system for providing map information according to an embodiment of the present invention.

Referring to FIG. 1, a map information providing system 100 according to an embodiment of the present invention includes a terminal 10, a service device 20 and a communication network 30.

In addition, a processor mounted on the service device 20 or the terminal 10 may process program instructions to execute the method according to an embodiment of the present invention. According to an example of implementation, the processor may be a single-threaded processor, and according to another example of implementation, the process may be a multithreaded processor. In addition, the processor may process instructions stored in a memory or a storage device.

The communication network 30 is a communication medium to transmit data or exchange information between the terminal 10 and the service device 20, and performs a series of data delivery. In particular, the communication network 30 may be provided using various types of communication networks, for example, a wireless communication scheme, such as wireless LAN (WLAN), Wi-Fi, Wibro, Wimax, and high speed downlink packet access (HSDPA) or a wired communication scheme, such as Ethernet, xDSL (ADSL and VDSL), hybrid fiber coax (HFC), fiber to the curb (FTTC), and fiber to the home (FTTH). Meanwhile, the communication network 30 according to an embodiment of the present invention is not limited thereto, and may include other types of communication networks that are widely known in the art or will be developed in the future.

The terminal 10 is connected to the service device 20 through the communication network 30 to transmit and receive map information required for execution of a navigation function. In particular, the terminal 10 according to an embodiment of the present invention executes a navigation function. In this case, the terminal 10 executes the navigation function by variably using a streaming image map transmitted from the service device 20 in real time and an embedded vector map stored in the terminal 10 in advance.

For example, upon initial execution of a navigation function, the terminal 10 outputs map information represented on a start-up scene, in the form of a streaming image map received from the service device 20 in real time.

Upon start of movement after information about a destination and an interested region are set in the navigation function, the terminal 10 displays map information associated with a scene showing a current travel state, in the form of an embedded vector map. Thereafter, the terminal 10, upon termination of the movement, displays map information associated with a current location by switching into using a streaming image map received from the service device 20. That is, the terminal 10, upon termination of the route guide, automatically switches from displaying map information in the form of an embedded vector map into displaying a streaming image map.

The service device 20 communicates with the terminal 10 through the communication network 30 to provide map information for execution of a navigation function. In particular, the service device 20 according to an embodiment of the present invention receives a signal requested by the terminal 10 for map information, in accordance with execution of a navigation function. In addition, in response to the map information requesting signal, the service device 20 identifies map information associated with the current location of the terminal 10, and transmits the identified map information in the form of a streaming image map.

As described above, the present invention variably supports two types of map information, including an embedded vector map and a streaming image map, in a navigation function, so that map information is displayed through a streaming image map when a detailed and clear image is needed, and while on the move, a route guide service is provided through an embedded vector map providing more accurate and comprehensive map information. In addition, map information that is applied to the navigation function is efficiently provided from the service device connected through the communication network, so that the navigation function provided from the terminal is efficiently performed using the map information.

Figure 2:
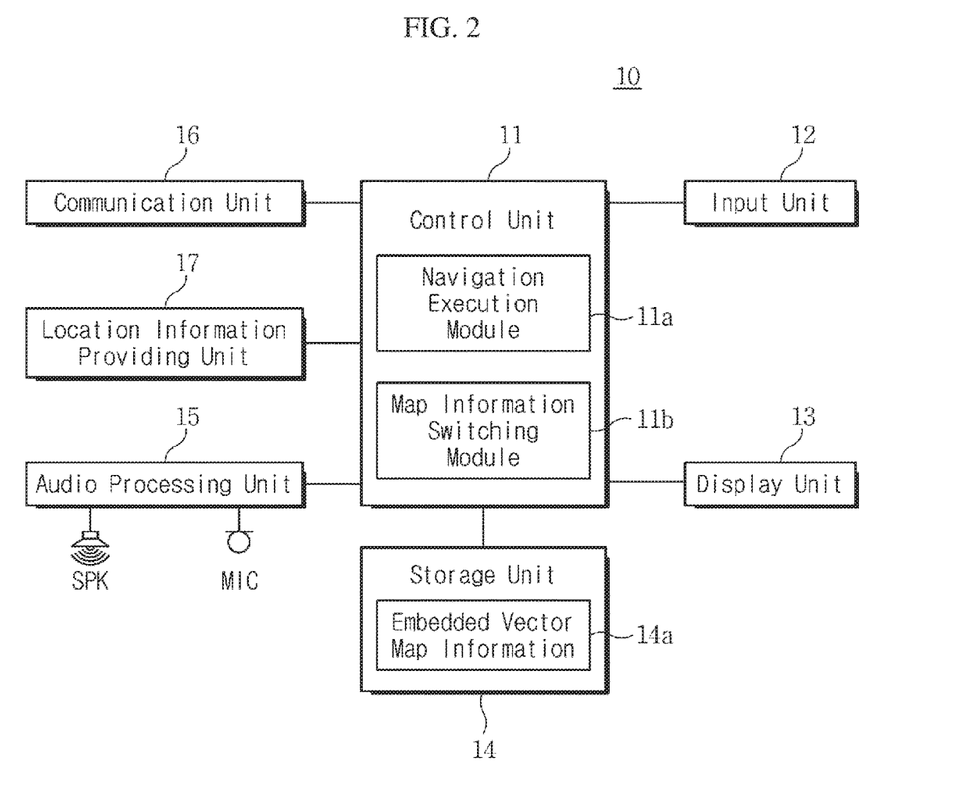
FIG. 2 is a block diagram illustrating a configuration of a terminal according to an embodiment of the present invention.

FIG. 2 is a block diagram illustrating a configuration of a terminal according to an embodiment of the present invention.

Referring to FIG. 2, the terminal 10 according to an embodiment of the present invention includes a control unit 11, an input unit 12, a display unit 13, a storage unit 14, an audio processing unit 15, a communication unit 16 and a location information providing unit 17. The control unit 11 includes a navigation execution module 11a and a map information switching module 11b, and the storage unit 14 includes embedded vector map information 14a.

The input unit 12 receives various types of information, such as number and text information, and sends the control unit 11 input signals that are associated with setting various functions and controlling the function of the terminal 10. The input unit 12 may include at least one of a key pad and a touch pad that are configured to generate an input signal according to a touch or manipulation of a user. In this case, the input unit 12 may be provided in the integrated form of a touch panel (or a touch screen) and the display unit 13, to simultaneously perform an input function and a display function. In addition, the input unit 12 may be provided using all types of input devices that will be developed in the future, in addition to known input devices, such as a keyboard, a keypad, a mouse, and a joy stick. In particular, the input unit 12 according to an embodiment of the present invention is configured to input a signal to execute a navigation function.

The display unit 13 displays information about states of a series of operations occurring in execution of the terminal 10 and the result of the operations. In addition, the display unit 13 may display a menu of the terminal 10 and user data that is input by a user. The display unit 13 may include a liquid crystal display (LCD), a thin film transistor LCD (TFT-LCD), an organic light emitting diodes (OLED), a light emitting diode (LED), an active matrix Organic LED (AMOLED), a flexible display and a 3D display. The display unit 13 may be provided in the form of a touch screen, and when the display unit 13 is provided in the form of a touch screen, the display unit 13 may perform a part or all of the functions of the input unit 12. In particular, the display unit 13 according to an embodiment of the present invention, during execution of a navigation function, displays map information by using an embedded vector map or a streaming image map depending on the travel state of a vehicle or a user.

The storage unit 14 is a device configured to store data, and includes a main memory device and a subsidiary memory device and stores applications required for operation of a function of the terminal 10. The storage unit 14 is largely divided into a program area and a data area. When each function of the terminal 10 is activated in response to a request of a user, each function is provided by executing the applications under the control of the control unit 11. In particular, a program area according to an embodiment of the present invention stores an operating system to boot the terminal 10, a program to execute a navigation function, and a program to variably apply an embedded vector map and a streaming image map to map information depending on a travel state of a vehicle or a user. In addition, the data area is an area storing data that occurs according to use of the terminal 10. In particular, the data area according to an embodiment of the present invention stores the embedded vector map information 14a that is applied to the navigation function. The embedded vector map information 14a is map information being displayed while a vehicle or user moves after execution of the navigation function, and may represent map information displaying more accurate and comprehensive information about a surrounding area. The embedded vector map information 14a is displayed on a screen in the form of an embedded vector map. The embedded vector map information 14a is downloaded from the service device 20 prior to execution of the navigation function, and stored in advance. In addition, the embedded vector map information 14a may be large capacity map information.

The audio processing unit 15 serves to send the control unit 11 an audio signal being input from a speaker (SPK) or microphone (MIC) that is configured to reproduce and output an audio signal. The audio processing unit 15 converts an analog format audio signal being input through the microphone into a digital format audio signal, and transmits the digital format audio signal to the control unit 11. In addition, the audio processing unit 15 converts a digital format audio signal being output from the control unit 11 into an analog format audio signal, and outputs the analog format audio signal through the speaker. In particular, the audio processing unit 15 according to an embodiment of the present invention outputs an effect sound or execution sound that is generated according to execution of the navigation function.

The communication unit 16 serves to transmit and receive data to/from the service device 20 through the communication network 30. The communication unit 16 includes an RF transmitter configured to perform up-conversion and amplification on the frequency of a transmitted signal and an RF receiver configured to perform low-noise amplification and down-conversion on the frequency of a received signal. The communication unit 16 may include at least one of a wireless communication module (not shown) and a wired communication module (not shown). The wireless communication module is configured to transmit and receive data according to a wireless communication scheme, and when the terminal 10 is provided using wireless communication, data may be transmitted or received to/from the service device 20 by using one of a wireless network communication module, a wireless LAN communication module and a wireless PAN communication module. In addition, the wired communication module is configured to transmit and receive data in a wired scheme. The wired communication module may transmit or receive data to/from the terminal 10 and the service device 20 by connecting to the communication network 30 via a wired scheme. That is, the terminal 10 connects to the communication network 30 by using the wired communication module, and transmits and receives data to/from the service device 20 through the communication network 30. In particular, the communication unit 16 according to the invention transmits and receives data for execution of a navigation function by communicating with the service device 20.

The location information providing unit 17 identifies current location information of the terminal 10, such as the latitude and the longitude of the terminal 10, by receiving GPS signals, from at least one GPS satellite, under the control of the control unit 11, and transmits the identified information to the control unit 11. However, when only the signals received from the GPS satellites are used, errors may occur. Therefore, the location information providing unit 17 may operate with round trip delay information and pilot phase file information, which are transmitted from a base station, together with the GPS signals to ensure accuracy of location information. The base station has two roles. One of the roles is to mediate data transmission between a communication center and the terminal 10, and the other one is to transmit data for identifying the location of the terminal 10, that is, the location of a user. Accordingly, the location information providing unit 17 may identify the location of the terminal 10 by receiving the above-described location information, or identify the current location information of the terminal 10 through triangulation identifying the accurate location by receiving location information from three or more base stations. In particular, the location information providing unit 17 according to an embodiment of the present invention collects current location information, location information about a destination, location information about an interested region, and location information associated with traffic conditions, for example, information about an accident area and a congestion area.

The control unit 11 may be a process device configured to drive an operating system (OS) and each element. For example, the control unit 11 may be a central processing unit (CPU). The control unit 11, when the terminal 10 is powered on, loads the operating system from a subsidiary memory device to a main memory device, and performs booting to drive the operating system, and performs a required signal control. In particular, the control unit 11 according to an embodiment of the present invention executes a certain application operated based on a map, that is, a navigation function. In addition, the control unit 11, upon execution of the map-based application, may display the map by variably applying streaming image map-based map information being received from the service device 20 and embedded vector map-based map information stored in the storage unit depending on a predetermined condition. The predetermined condition may be variously defined. For example, when the application is an application for executing a navigation function, the predetermined condition may be defined as follows.

That is, the control unit 11 provides map information, displayed on a start-up scene upon execution of a navigation function, in the form of a streaming image map. In this case, the control unit 11 receives map information represented in the form of a streaming image map from the service device 20, and outputs the received map information on the screen. The control unit 11 may receive the map information from the service device 20 in a streaming-based transmission scheme.

The control unit 11, when a vehicle or a user starts moving, displays the map information associated with a scene displaying the current travel state, in the form of the embedded vector map. That is, the control unit 11, upon start of movement, switches map information having been displayed on the start-up scene in the form of a streaming image map into an embedded vector map, and displays the switched map information. To this end, the control unit 11 downloads map information represented in the form of an embedded vector map from the service device 20, and stores the downloaded map information in advance.

Meanwhile, when the movement is terminated, the control unit 11 displays map information associated with the current location by switching from using the embedded vector map into using a streaming image map. That is, the control unit 11 switches map information having been displayed using an embedded vector map while on the move into using a streaming image map, and displays the switched map information. The control unit 11 receives map information from the service device 20 in a streaming scheme. In addition, the control unit 11, upon termination of a route guide, automatically switches the map information having been displayed using the embedded vector map into using the streaming image map, and displays the switched map information.

In addition, the control unit 11 according to an embodiment of the present invention may sense whether a vehicle while driving stops, or an event for requesting map information about a surrounding area of the current location occurs. Subsequently, the control unit 11, upon occurrence of the event, receives map information about a surrounding area of the current location in the form of a streaming image map from the service device 20, and provides the received map information in the form of a streaming image map.

In addition, the control unit 11 downloads the embedded vector map-based map information from the service device 20, and stores the downloaded embedded vector map-based map information in the storage unit 14. In particular, the control unit 11 may download the embedded vector map-based map information regardless of execution of the application. For example, one of a load of the network and a load of the terminal 10 is checked, and at a predetermined point of time that is set based on the checked load, the embedded vector map-based map information may be downloaded from the service device 20. That is, loads of the network and the terminal are checked, and when the loads of the network and the terminal are low, the embedded vector map-based map information is downloaded, to prevent the loads of the network and the terminal from being increased too much. In this case, the embedded vector map-based map information may be downloaded in stages depending on at least one of the load of the network and the load of the terminal. That is, when the embedded vector map-based map information has a large size, or is needed for updating, the embedded vector map-based map information may be divided depending on a predetermined criterion, and downloaded in stages.

In order to more effectively perform the function of the terminal 10, the control unit 11 includes the navigation execution module 11a and the map information switching module 11b. In particular, the navigation execution module 11a controls the overall operation of the navigation function executed according to a user's input. In this case, the navigation execution module 11a may separately execute the navigation functions divided for a user map and a vehicle map, and may download map information about an embedded vector map for implementation of a navigation function from the service device 20, and store the downloaded map information.

Meanwhile, the map information switching module 11b performs to variably switch between map information displayed on a start-up scene in execution of a navigation function and map information displaying the current travel state while a user or a vehicle is on the move. That is, the map information switching module 11b provides map information displayed on a start-up scene of navigation in the form of a streaming image map, and upon start of movement, displays map information associated with a scene showing a travel state by switching into using an embedded vector map. Thereafter, upon termination of the movement, the map information switching module 11b displays map information associated with the current location by switching into using a streaming image map.

Figure 3:
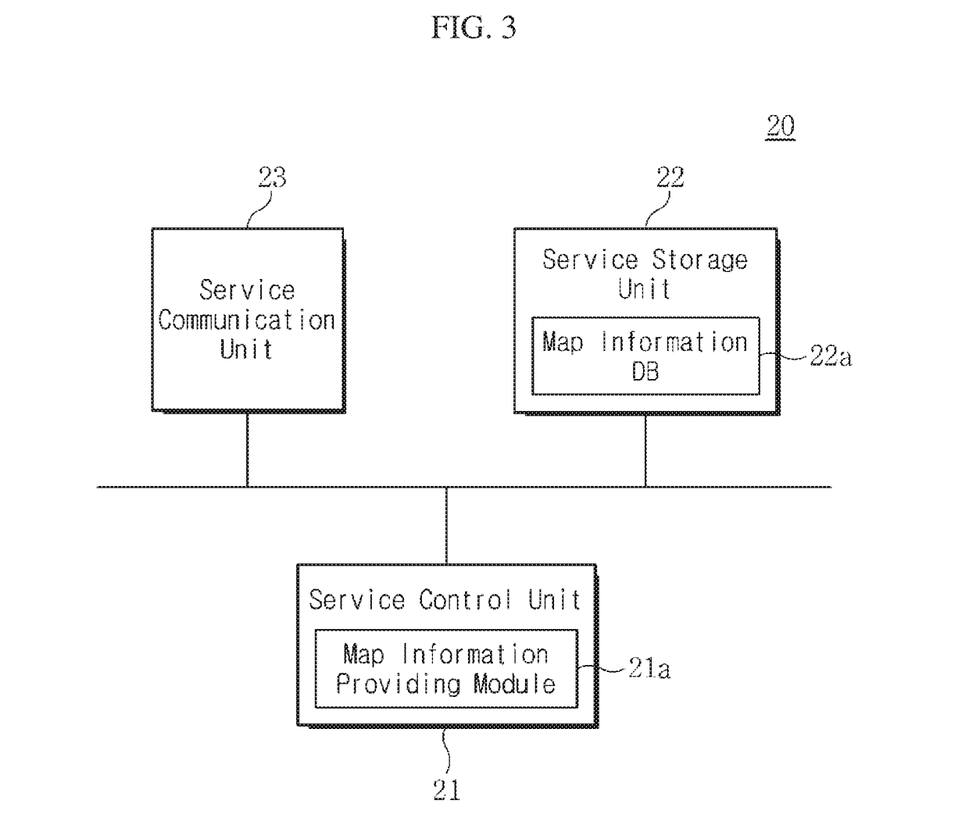
FIG. 3 is a block diagram illustrating a configuration of a service device according to an embodiment of the present invention.

FIG. 3 is a block diagram illustrating a configuration of a service device according to an embodiment of the present invention.

Referring to FIG. 3, the service device 20 according to an embodiment of the present invention includes a service control unit 21, a service storage unit 22 and a service communication unit 23. The service control unit 21 includes a map information providing to module 21a, and the service storage unit 22 includes a map information DB 22a.

The service communication unit 23 transmits and receives data for executing a navigation function to/from the terminal 10 through the communication network 30. In particular, the service communication unit 23 transmits and receives map information according to execution of a navigation function by communicating with the terminal 10.

The service storage unit 22 stores overall data generated according to execution of functions of the service storage unit 22. In particular, the service storage unit 22 according to an embodiment of the present invention stores map information for execution of a navigation function in the map information DB 22a.

The service control unit 21 may be a process device configured to drive an operating system and each element of the service device 20. In particular, the service control unit 21 according to an embodiment of the present invention receives a signal requested by the terminal 10 for map information. The service control unit 21 identifies map information associated with the current location of the terminal 10 according to the map information requesting signal, and transmits the identified map information in the form of a streaming image map.

In order to more effectively perform the function of the service device 20, the service control unit 21 includes the map information providing module 21a. In particular, the map information providing module 21a performs a function to variably display map information displayed on a start-up scene in a navigation execution of the terminal 10, and map information displayed on the terminal 10 upon termination of the movement of a vehicle or a user. That is, upon termination of a route guide, the map information providing module 21a provides map information in the form of a streaming image map rather than the map information in the form of an embedded vector map in an autonomous manner or according to a request by the terminal 10, and supports the terminal 10 to switch into displaying the streamlining image map.

In addition, the service device 20 having the above described configuration may be provided using at least one server operating in a server-based computing scheme or a cloud computing scheme. In particular, map information for executing a navigation function by using a cloud computing device may be provided by a cloud computing function that allows the map information to be permanently stored in a cloud computing device on the Internet. The cloud computing represents technology for providing digital terminals, such as a desktop, a tablet PC, a notebook, a netbook and a smart phone, with information technology (IT) resources virtualized using Internet technology, for example, hardware (a server, a storage and a network), software (database, security, and web server), services and data, on-demand.

Meanwhile, a memory mounted on the service device 20 or the terminal 10 stores information in the service device 20 or the terminal 10. According to an example of implementation, the memory may be a computer readable medium. According to an example of implementation, the memory may be a volatile memory unit, and according to another example of implementation, the memory may be a nonvolatile memory unit. According to an example of implementation, a storage device may be a computer readable medium. According to various examples of implementation, the storage device may include a hard disk device, an optical disk device or other large capacity storage devices.

Although an exemplary configuration of the apparatus is illustrated in the specification and drawings, an embodiment of the functional operation and subject matter described in the specification may be implemented in other types of digital electronic circuits, or implemented in computer software, firmware, or hardware including a structure disclosed in the specification and its equivalent, or implemented in the combination of one or more of these. An embodiment of the subject matter described in the specification may be embodied as one or more computer program products, that is, one or more modules related to a computer program instruction encoded in a program storage medium to control an operation of the apparatus according to the present invention or to be run by the operation. The computer readable medium may be a machine readable storage device, a machine readable storage board, a memory device, a composition of material having an influence on an electric waveform signal readable by a machine, or the combination of one or more of these FIG. 4 is a flowchart showing an operation of a terminal according to an embodiment of the present invention.

Figure 4:
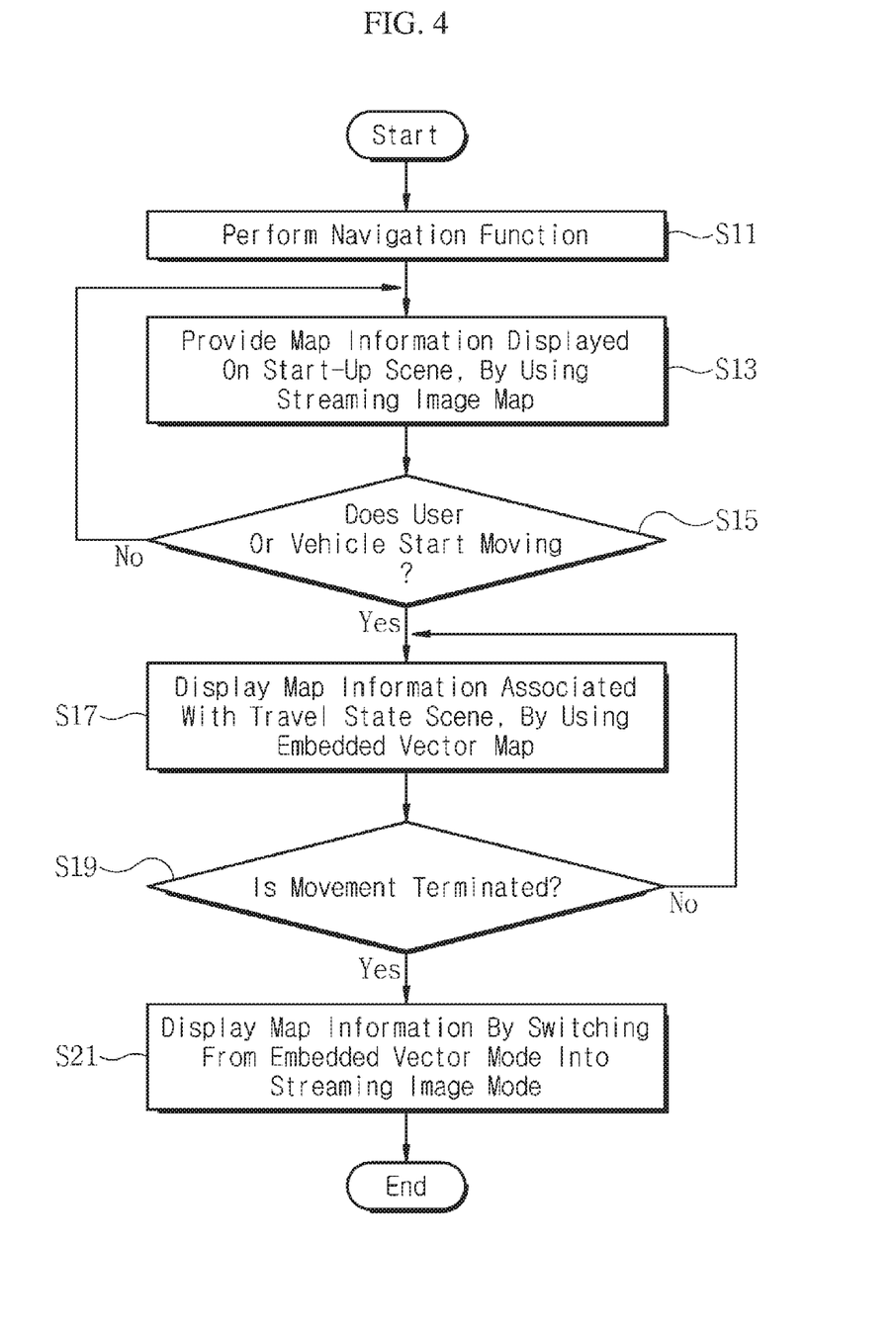
FIG. 4 is a flowchart showing an operation of a terminal according to an embodiment of the present invention.

Referring to FIG. 4, the terminal 10 according to an embodiment of the present invention performs a navigation function (S11). The terminal 10 provides map information displayed on a start-up scene of the navigation function, in the form of a streaming image map (S13). In this case, the terminal 10 receives map information represented in the form of a streaming image map from the service device 20, and outputs the received map information on a screen.

The terminal 10 checks whether a user or a vehicle starts moving (S15). The terminal 10, upon a vehicle or user starting movement, displays map information associated with a scene displaying a travel state, in the form of an embedded vector map (S17). To this end, the terminal 10 downloads map information represented in the form of an embedded vector map from the service device 20, and stores the downloaded map information in advance. That is, the terminal 10, upon sensing a movement, switches map information having been displayed in the form of a streaming image map on the current scene into an embedded vector map, and displays the embedded map. That is, the terminal 10 stops receiving a streaming image map from the service device 20, and loads embedded vector map-based map information stored in advance and outputs the loaded information.

Meanwhile, unless sensing a movement, the terminal 10 keeps displaying the map information, which has been displayed on the start-up scene in the form of a streaming image map according to execution of a navigation function.

Thereafter, the terminal 10 checks whether the movement of a user or vehicle is terminated (S19). Upon termination of the movement, the terminal 10 displays map information associated with a current location by switching into using a streaming image map (S21). That is, the terminal 10, if a movement of a vehicle or user is not detected, switches the map information being output on the current scene from using an embedded vector map into using a streaming image map, and displays the switched map information. In addition, the terminal 10, upon termination of a route guide, automatically switches the map information having been displayed in the form of an embedded vector map into using a streaming image map, and displays the switched map. In detail, the terminal 10 receives streaming image map-based map information corresponding to the current location from the service device 20 by resuming communication with the service device 20, and processes and outputs the received streaming image map-based map information.

In addition, according to an embodiment of the present invention, operations S13 and S21 of receiving and displaying map information in a streaming scheme may be achieved by the terminal 10 requesting and receiving the map information from the service device 20, and by the terminal 10 processing the received map information and outputting the processed map information in the form of a streaming image map.

In addition, although not shown in FIG. 4, the terminal 10 may perform processes of downloading embedded vector map-based map information from the service device 20, and storing the downloaded map information in the storage unit 14 prior to operations S11 and S13.

Although not shown in FIG. 4, in operation S15, the terminal 10 may sense whether vehicle driving stops or an event requesting detailed map information about a surrounding area of the current location occurs, and if the event is sensed, may switch into a streaming image map-based operation to receive streaming image map-based map information corresponding to the current location information in a streaming scheme and output the received map information.

As described above, according to the present invention, two types of map information including an embedded vector map-based map and a streaming image map-based map are variably supported in the navigation function. When a detailed and clear image is needed, map information is displayed through a streaming image map, and while on the move, a route guide service is provided through an embedded vector map providing more accurate and comprehensive map information. In addition, map information applied to a navigation function is efficiently received from a service device connected to a communication network, and by is using the received map information, a navigation function provided from the terminal is efficiently performed.

Figure 5:
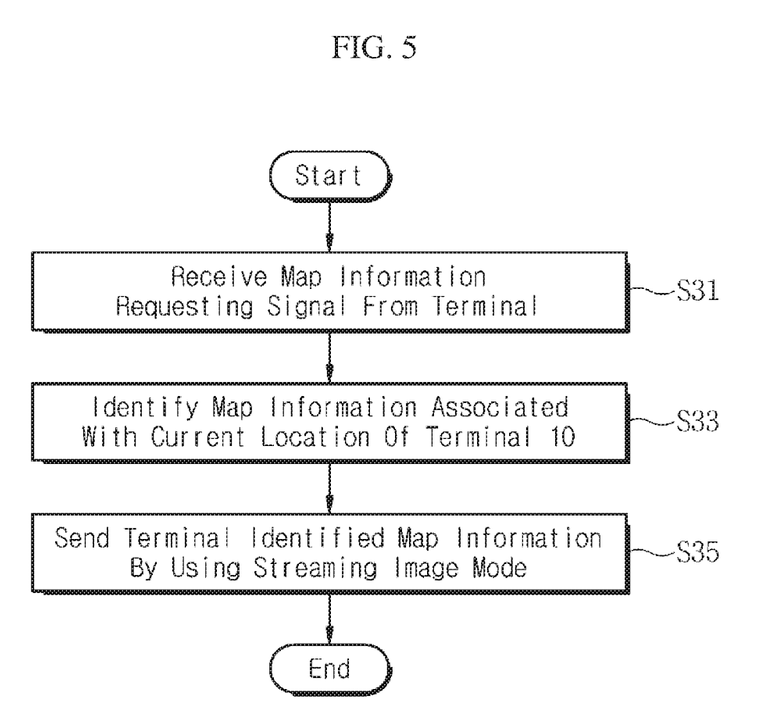
FIG. 5 is a flowchart showing an operation of a service device according to an embodiment of the present invention.

FIG. 5 is a flowchart showing an operation of a service device according to an embodiment of the present invention.

Referring to FIG. 5, the service device 20 according to an embodiment of the present invention receives a signal requested by the terminal 10 for map information (S31). The service device 20 identifies map information associated with the current location of the terminal 10 according to the map information requesting signal (S33). Thereafter, the service device 20 transmits the identified map information in the form of a streaming image map (S35). That is, the service device 20 sends the terminal 10 map information to be displayed on a start-up scene according to execution of a navigation function, in a streaming scheme. In addition, the service device 20, upon termination of a user or vehicle's movement, may send the terminal 10 map information displayed at the current location in a streaming scheme.

Figure 6A:
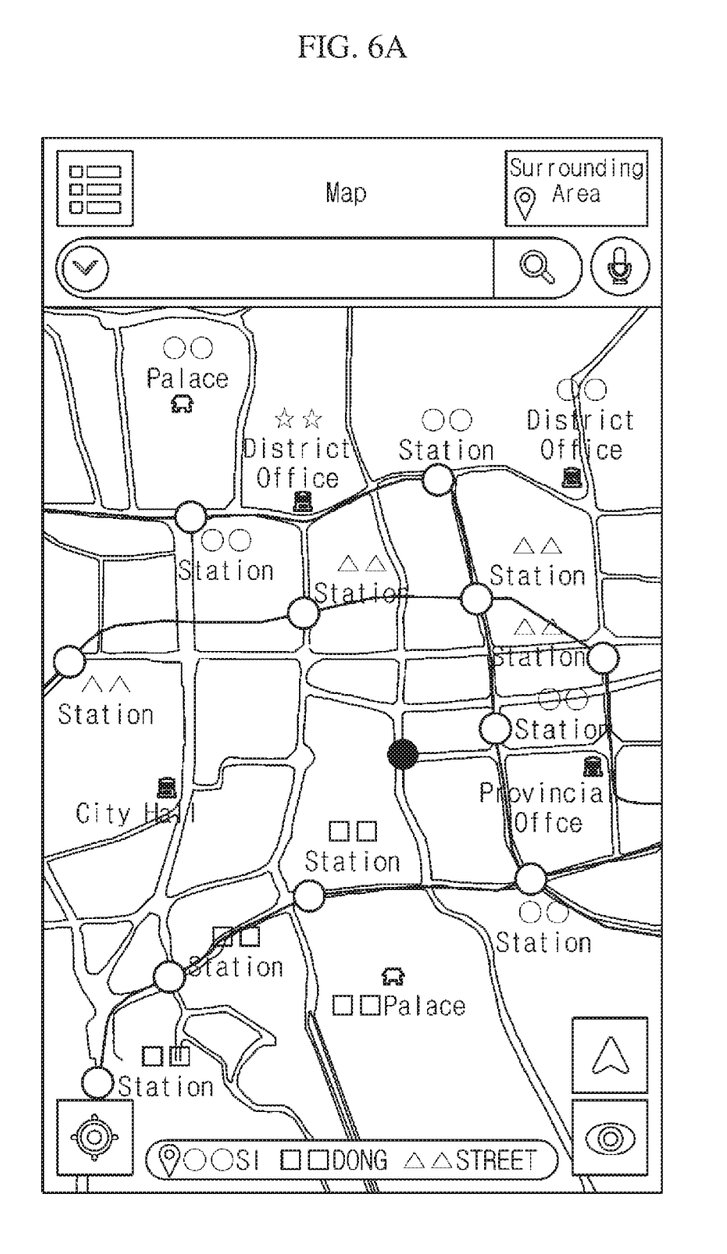
FIGS. 6A and 6B are views illustrating a method of providing map information according to an embodiment of the present invention.
Figure 6B:
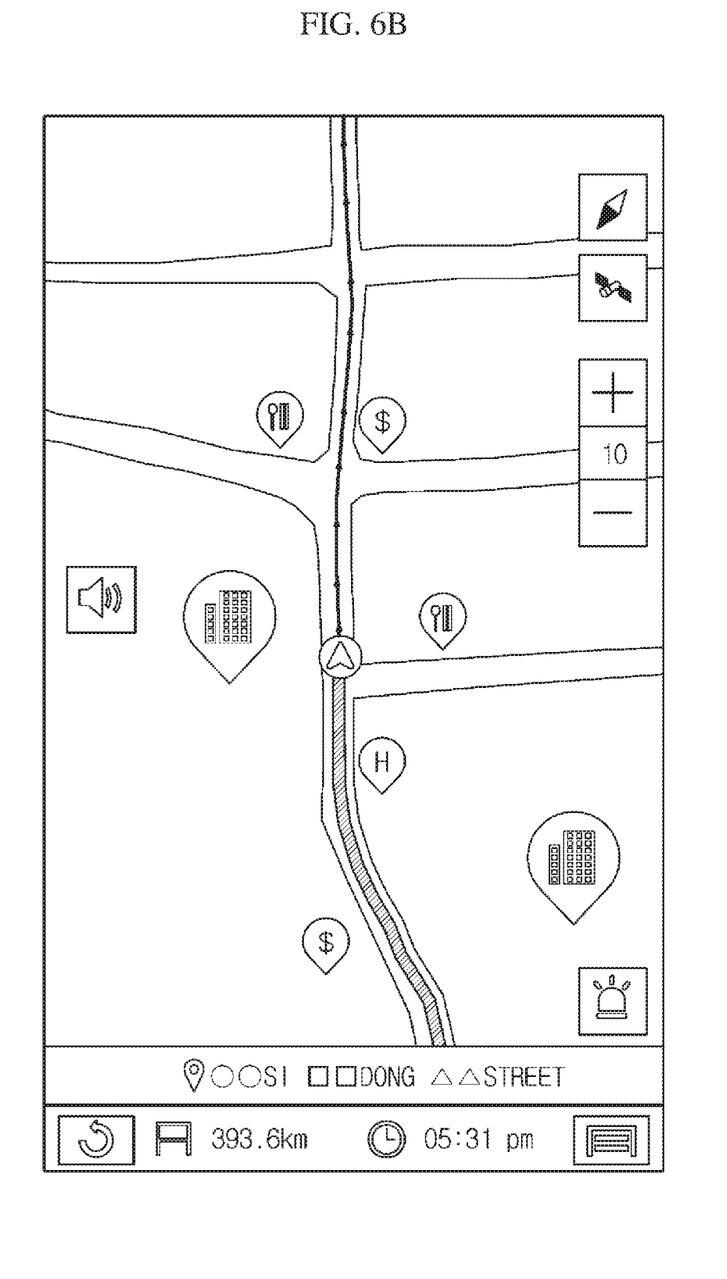

FIGS. 6A and 6B are views illustrating a method of providing map information according to an embodiment of the present invention.

Referring to FIG. 6A, the terminal 10 according to an embodiment of the present invention provides map information displayed on a start-up scene of a navigation function in the form of a streaming image map. In order for the terminal 10 to provide map information in the form of a streaming image map, the terminal 10 receives map information from the service device 20 in a streaming scheme.

As shown in FIG. 6B, the terminal 10, upon start of a user or vehicle's movement, displays map information associated with a scene displaying the current travel state in the form of an embedded vector map. To this end, the terminal 10 downloads embedded vector map-based map information from the service device 20 and stores the downloaded map information, regardless of execution of a navigation function.

Thereafter, the terminal 10, upon termination of the movement, displays map information associated with the current location by switching into using a streaming image map.

The various technologies described in the specification may be implemented as a computer program product (e.g., a computer program embodied in an information carrier, e.g., a computer readable medium or electric waveform signal), to perform processing according to operation of a programmable processor, a computer or a plurality of computers, or control the operation. The computer program may be recoded in any form of program languages including a compiled language and an interpreted language, and may be developed in any form by including an independent program or a module, component, subroutine, or any other unit suitable for use in a computer environment. The computer program may be located at a single site and executed on multiple computers, or distributed over a plurality of sites connected to one another through a communication network.

Examples of a computer readable medium include magnetic media such as a hard disk, a floppy disk and magnetic tapes, optical media such as a compact disk read only memory (CD-ROM) and a digital video disk (DVD), magneto-optical media such as a floptical disk, and a semiconductor memory such as a read only memory (ROM), a random access memory (RAM), a flash memory device, an erasable programmable ROM (EPROM), and an electrically erasable programmable ROM (EEPROM).

The specification includes details of a number of specific implements, but it should be understood that the details do not limit the present invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all of the operations be executed. In some cases, a multitasking and a parallel processing may be beneficial. In addition, it should not be understood that the separation of various system components in the above described embodiments is needed in all embodiments, and it should be understood that the above described program components and systems may be incorporated into a single software product or may be packaged in multiple software products.

The embodiments disclosed in the specification with reference to accompanying drawings are only provided to best disclose the present invention and assist those skilled in the art to completely understand the present invention, and the scope of the present invention is not limited to such embodiments. It would be appreciated by those skilled in the art that changes and modifications, which have not been illustrated above, may be made in the embodiments without departing from the scope of the invention.

INDUSTRIAL APPLICABILITY

Therefore, the present invention can display map information by variably applying a streaming image map and an embedded vector map in a route guide service using a navigation function depending on a travel state. The present invention can variably support two types of map information, including an embedded vector map and a streaming image map, in a navigation function, so that map information is displayed in the form of a streaming image map when a detailed and clear image is needed, and a route guide service is provided through an embedded vector map that provides more accurate and comprehensive map information while on the move, is while being marketable and actually implementable, thereby ensuring the industrial applicability.

The invention claimed is:

1. A method for providing may information at an apparatus configured to switch may information between a streaming image may basis and an embedded vector map basis and display the map information, the method comprising:

executing a may application;

switching the streaming image may basis to the embedded vector may basis when route guidance commences in the map application and movement is detected;

displaying map information that is stored in advance on the embedded vector map basis according to the route guidance;

switching the embedded vector may basis to the streaming image may basis when the route guidance is terminated; and requesting map information corresponding to current location information from a service device and displaying the may information received from the service device in a streaming manner on the streaming image may basis.

2. The method of claim 1, wherein the executing of the may application comprises:
   requesting map information of an initial screen corresponding to location information of the may application from the service device;
   receiving the may information corresponding to the initial screen from the service device in a streaming manner; and
   displaying the received may information on the streaming image may basis.

3. The method of claim 1, further comprising, before the switching of the streaming image map basis to the embedded vector map basis,
   requesting map information which is to be displayed on the embedded vector ma basis from the service device;
   receiving the map information from the service device; and
   storing the received map information.

4. The method of claim 1, further comprising:
   detecting an event indicating that the apparatus stops moving or an event requesting detailed map information about a surrounding area of a current location occurs while the route guidance is performed;
   requesting may information corresponding to the current location information from the service device;
   receiving the map information from the service device in a streaming manner; and
   displaying the received may information on the streaming image may basis.

5. An apparatus configured to switch may information between a streaming image may basis and an embedded vector may basis and display the may information, the apparatus comprising:
   a communication unit configured to receive map information from a service device in a streaming manner;
   a storage unit configured to store the may information, which has already been received from the service device, on the embedded vector map basis;
   a control unit configured to perform control to switch the streaming image may basis to the embedded vector may basis and display map information prestored in the storage unit on the embedded vector may basis according to route guidance when executing a may application to start the route guidance and detecting movement, and configured to perform control to switch the embedded vector map basis to the streaming image map basis, request and receive map information corresponding to current location information from the service device through the communication unit and then display the may information on the streaming image may basis when the route guidance is terminated; and
   a display unit configured to switch may information on the streaming image may basis or the embedded vector map basis and display the map information according to the control performed the control unit.

6. The apparatus of claim 5, wherein, when the map application is executed, the control unit requests map information of an initial screen corresponding to location information from the service device through the communication unit, and performs control to display the may information received from the service device in a streaming manner through the communication unit of the streaming image may bases.

7. The apparatus of claim 6, wherein the location information indicates location information currently obtained by locating the apparatus or location information of a destination input by a user.

8. The apparatus of claim 5, wherein the control unit performs control to receive may information about a surrounding area of a current location from the service device when detecting an event indicating that the apparatus stops moving or an event requesting detailed map information about the surrounding area of the current location while the route guidance is performed, and display the received map information on the streaming image may basis.

* * * * *

UNITED STATES PATENT AND TRADEMARK OFFICE
CERTIFICATE OF CORRECTION

PATENT NO. : 10,060,755 B2
APPLICATION NO. : 15/336417
DATED : August 28, 2018
INVENTOR(S) : Jihye Heo It is certified that error appears in the above-identified patent and that said Letters Patent is hereby corrected as shown below:

In the Claims

In Column 14, Claim 1, Line 48, delete "may" and insert --map--.

In Column 14, Claim 1, Line 49, delete "may" and insert --map--.

In Column 14, Claim 1, Line 53, delete "may" and insert --map--.

In Column 14, Claim 1, Line 54, delete "may" and insert --map--.

In Column 14, Claim 1, Line 60, delete "may" and insert --map--.

In Column 14, Claim 1, Line 65, delete "may" and insert --map--.

In Column 14, Claim 1, Line 67, delete "may" and insert --map--.

In Column 15, Claim 2, Line 2, delete "may" and insert --map--.

In Column 15, Claim 2, Line 4, delete "may" and insert --map--.

In Column 15, Claim 2, Line 6, delete "may" and insert --map--.

In Column 15, Claim 2, Line 9, delete "may" and insert --map--.

In Column 15, Claim 3, Line 15, delete "ma" and insert --map--.

In Column 15, Claim 4, Line 24, delete "may" and insert --map--.

In Column 15, Claim 4, Line 30, delete "may" and insert --map--.

Signed and Sealed this
Tenth Day of March, 2020

Andrei Iancu
*Director of the United States Patent and Trademark Office*

CERTIFICATE OF CORRECTION (continued)
U.S. Pat. No. 10,060,755 B2

In Column 15, Claim 5, Line 31, delete "may" and insert --map--.

In Column 15, Claim 5, Line 32, delete "may" (both instances) and insert --map--.

In Column 15, Claim 5, Line 37, delete "may" and insert --map--.

In Column 16, Claim 5, Line 2, delete "may" and insert --map--.

In Column 16, Claim 5, Line 4, delete "may" and insert --map--.

In Column 16, Claim 5, Line 5, delete "may" and insert --map--.

In Column 16, Claim 5, Line 6, delete "may" and insert --map--.

In Column 16, Claim 5, Line 12, delete "may" (both instances) and insert --map--.

In Column 16, Claim 5, Line 14, delete "may" and insert --map--.

In Column 16, Claim 5, Line 15, delete "may" and insert --map--.

In Column 16, Claim 6, Line 22, delete "may" and insert --map--.

In Column 16, Claim 6, Line 24, delete "may" and insert --map--.

In Column 16, Claim 8, Line 31, delete "may" and insert --map--.

In Column 16, Claim 8, Line 37, delete "may" and insert --map--.